May 1, 1962 G. G. BUDWIG 3,032,274
DUAL GARDEN SPRAY DEVICE
Filed May 5, 1958
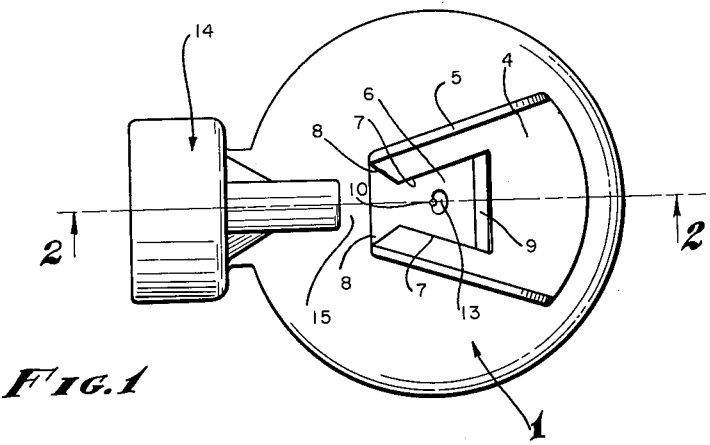
FIG.1
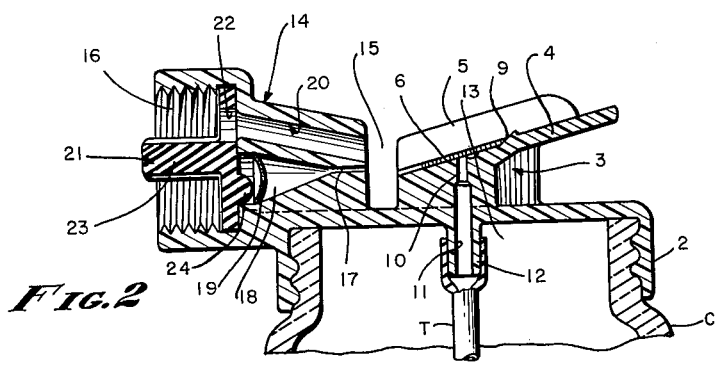
FIG.2
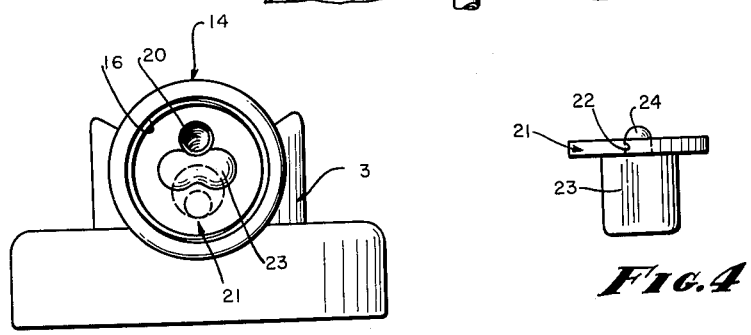
FIG.3
FIG.4
INVENTOR.
GILBERT G. BUDWIG
BY Lyon & Lyon
ATTORNEYS United States Patent Office 3,032,274
Patented May 1, 1962

3,032,274
DUAL GARDEN SPRAY DEVICE
Gilbert G. Budwig, 3400 Bayside Walk,
Mission Beach, Calif.
Filed May 5, 1958, Ser. No. 733,012
1 Claim. (Cl. 239—310)

This invention relates to dual garden spray devices, and included in the objects of this invention are:

First, to provide a garden spray device which is so arranged that either of two predetermined mixtures of water and entrained chemical may be interchangeably selected, thereby providing a garden spray device which may be utilized as an insect spray wherein a relatively concentrated mixture of insecticide and water is desired, or as a fertilizer spray wherein a relatively diluted mixture of a fertilizer and water is desired.

Second, to provide a dual garden spray device which is particularly simple and economical of manufacture and which involves a minimum of parts.

With the above and other objects in view, as may appear hereinafter, reference is directed to the accompanying drawings in which:

FIGURE 1 is a plan view of the dual garden spray device;

FIGURE 2 is a transverse sectional view thereof through 2—2 of FIGURE 1 with a container and aspirator tube shown connected thereto and fragmentarily;

FIGURE 3 is an end view thereof;

FIGURE 4 is a side view of the washer valve.

The dual garden supply device includes a base 1 in the form of a flat disk which may serve as a cover for a container C. The base is provided with an internally screw-threaded depending flange 2 for connection to the container.

Mounted on the base 1 is a supporting boss 3 on which is formed an impingement plate 4 which extends at a small, acute angle upwardly from the surface of the base 1. The impingement plate 4 is provided with upwardly diverging side flanges 5.

Formed within the surface of the impingement plate 4 is a depressed area 6 having low diverging side walls 7 substantially paralleling the side flanges 5. At their closer ends, the side walls 7 join to entrance side walls 8 which diverge toward the low side of the impingement plate and join the side flanges 5.

The depressed area 6 forms a primary impingement surface whereas the remaining portion of the impingement plate 4, beyond the depressed area 6 and at the sides thereof, forms a secondary impingement surface. The forward or widest end of the depressed area 6 merges into the secondary impingement surface of the plate 4 by means of a rudimentary ramp or deflecting rib 9, which preferably projects a slight distance above the secondary impingement surface of the impingement plate 4.

Located in the depressed area 6 at approximately the center of the base 1 is an aspirator port 10 which extends downwardly and joins a passage 11 of large diameter which is formed within a depending boss 12. The boss 12 is adapted to receive an aspirator tube T which extends to the bottom of the container C. The depressed area 6 or primary impingement surface is provided with a recess 13 bordering and partially intersecting the upstream side of the aspirator port 10.

Mounted at one side of the base 1 is a nozzle boss 14 which is separated from the supporting boss 3 by a slot or channel 15. The nozzle boss 14 is provided with an internally screw-threaded socket 16 disposed at right angles to the axis of the internally screw-threaded flange 2.

The nozzle boss 14 is provided with a lower nozzle bore 17 extending from the socket 16 toward the impingement plate 4, and is so located that a jet of water discharging from the bore 17 will strike the primary impingement surface or depressed area 6 short of the aspirator port 10, in order that the water will flow fanwise at high velocity over the aspirator port 10 and recess 13. The discharge end of the lower nozzle bore 17 is of relatively small diameter but is enlarged as it approaches the socket 16, forming a conical portion 18 in which is fitted a small strainer 19.

The nozzle boss 14 is also provided with an upper nozzle bore 20 of larger diameter than the lower bore 17 and is disposed at a greater angle, so that its axis also intersects the depressed area 6 short of the aspirator port 10.

Mounted within the socket 16 is a washer valve 21 formed of rubber or other sealing material and in the form of a disk. The washer valve is provided with an eccentric port 22 which, upon rotation of the washer valve 21, may be aligned with either the lower nozzle bore 17 or the upper nozzle bore 20. To facilitate turning of the washer valve 21, there is provided a handle knob 23 dimensioned to clear the hose fitting which is intended to be screw-threaded into the socket 16. The side of the washer valve 21 confronting the bores may be provided with a small lug 24 adapted to enter partially into either bore so that the washer valve may be readily positioned.

Operation of the dual garden spray device is as follows:

If it is desired to spray insecticide, or other chemicals, in which a relatively high concentration of chemical is desired, the washer valve 21 is positioned so that the port 22 communicates with the lower nozzle bore 17. The spray device is screw-threaded to a container filled with the appropriate chemical. The socket 16 is screw-threaded to the end of a garden hose.

Flow of water through the lower nozzle bore 17 creates a vacuum pressure in the recess 13 and aspirator port 10 so as to withdraw a proportionate amount of chemical from the container C. Due to the relatively small volume of water which can discharge through the small bore 17 and due to the corresponding high velocity of the water, a relatively rich mixture of chemical is obtained. By choice in the size of the bore 17, aspirator port 10, and recess 13, this ratio may range between 10:1 and 40:1.

If it is desired to apply liquid fertilizer or other chemical in which a relatively low concentration is desired, the washer valve 21 is positioned as shown in FIGURE 2, to expose the upper nozzle bore 20. The appropriate chemical is placed in the container C and the base 1 is screw-threaded thereon.

Flow of water through the relatively large nozzle bore 20 is in comparatively larger volume and correspondingly lower velocity than flow through the lower constricted nozzle bore 17 so that the vacuum pressure created in the aspirator port 10 and recess 13 is lower. As a consequence, the ratio of chemical to water is much lower. For example, it may range from 40:1 to 100:1, depending upon the selected size of bores.

Irrespective of which bore is used, but more particularly when the upper nozzle bore 20 is used and the flow of water is relatively large, the mixing of the chemical in the water spray is accomplished in two stages. The chemical is first mixed with the underlying water moving at high velocity over the primary impingement surface 6. The underlying portion of the water is deflected upwardly by the rib or ramp 9 and tends to traverse the overlying layer of water so that there is an intermixing of the two layers of water and a thorough distribution of the chemical throughout the entire spray. There is a tendency for a vacuum condition to develop at the upstream side of the rib 9 so that water is drawn down to the secondary impingement surface 4, and during flow of water along this surface further mixing of the chemical with the water occurs.

While a particular embodiment of this invention has been shown and described, it is not intended to limit the same to the exact details of the construction set forth, and it embraces such changes, modifications, and equivalents of the parts and their formation and arrangement as come within the purview of the appended claim.

What is claimed is:

A dual garden spray device, comprising: a cover adapted for attachment to a container; means on said cover defining a secondary impingement surface having diverging side walls and a primary impingement surface depressed into said secondary impingement surface and also having diverging side walls, there being a sloping transition impingement surface at the larger end of said primary impingement surface, said means also defining an aspirator port communicating with said container; means on said cover for attachment to a hose and defining an internally screw-threaded socket adapted to receive a hose fitting and having an end wall, a pair of nozzle bores disposed on axes obtusely related to said surfaces and adapted to discharge water in the direction of divergence of said side walls, said bores positioned to cause high velocity flow of water over said aspirator port; a washer element rotatably disposed in said hose-receiving means and covering both of said bores, said washer element having a port adapted to be positioned in registry with either of said bores to permit flow through either of said bores while said washer element closes the other of said bores, the marginal portion of said washer adapted to be clamped between the end wall of said chamber and a hose fitting to form a sealing connection, said washer including a positioning lug adapted to extend into said other bore to prevent rotation of said washer upon clamping said washer marginal portion against said end wall.

References Cited in the file of this patent
UNITED STATES PATENTS

| | | |
|---|---|---|
| 155,852 | Bowen | Oct. 13, 1874 |
| 208,122 | Raymond et al. | Sept. 17, 1878 |
| 1,747,670 | Hull | Feb. 18, 1930 |
| 2,030,853 | Budwig | Feb. 18, 1936 |
| 2,061,932 | Budwig | Nov. 24, 1936 |
| 2,260,603 | Budwig | Oct. 28, 1941 |
| 2,521,490 | Strauss | Sept. 5, 1950 |
| 2,744,791 | Budwig | May 8, 1956 |
| 2,753,213 | Offutt | July 3, 1956 |